March 20, 1962 S. M. MATUSKY ET AL 3,025,997
CONTAINER HANDLE
Filed June 15, 1961 2 Sheets-Sheet 1

INVENTORS
Steve M. Matusky,
BY Carl M. Gustafson,
& William H. Laffan
Victor J. Evans & Co.
Attorneys March 20, 1962  S. M. MATUSKY ET AL  3,025,997
CONTAINER HANDLE
Filed June 15, 1961  2 Sheets-Sheet 2
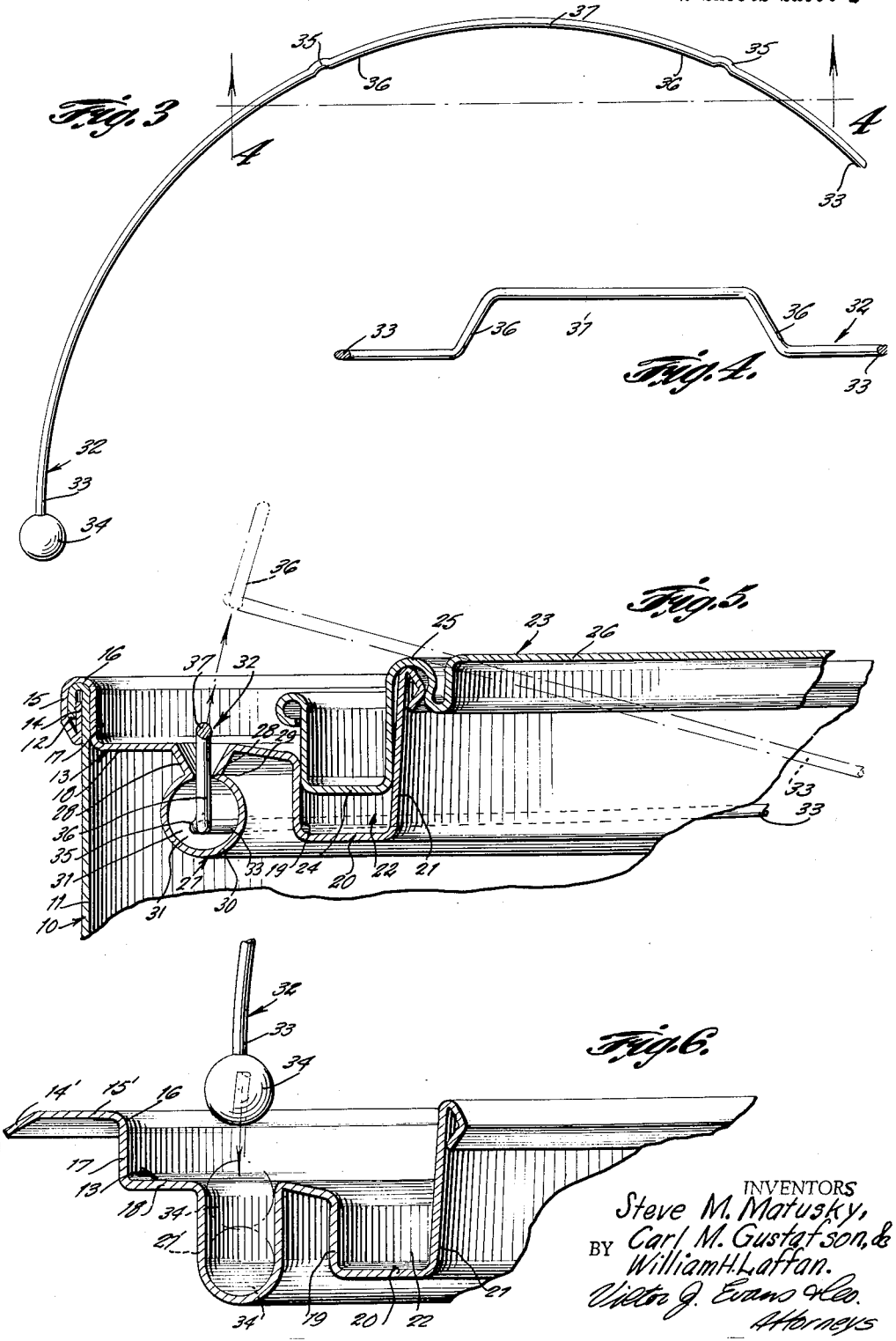
INVENTORS
Steve M. Matusky,
BY Carl M. Gustafson, &
William H. Laffan.
Victor J. Evans & Co.
Attorneys

United States Patent Office 3,025,997
Patented Mar. 20, 1962

3,025,997
CONTAINER HANDLE
Steve M. Matusky, 5330 S. Wolcott, Chicago, Ill.; Carl M. Gustafson, Chicago, Ill. (10526 S. 83rd Ave., Palos Hills, Ill.) and William H. Laffan, 4355 S. Sawyer, Chicago, Ill.
Filed June 15, 1961, Ser. No. 117,456
2 Claims. (Cl. 220—95)

The present invention relates to a handle for a can or container, and more particularly to a handle for a paint can or the like.

The primary object of the present invention is to provide a novel and improved means for connecting a bail or handle to a can or container, and wherein according to the present invention the handle can be arranged below the upper level of the can or container when desired or required, and wherein the present invention eliminates ears at the sides of the container so that the costly and time consuming previous arrangement of soldering ears on the container for the handle is eliminated, and wherein the handle of the present invention facilitates stacking of cans or containers one upon the other.

A further object is to provide such a container handle which is such that the handle can swivel through a wide arc, and wherein the handle can be readily slipped into the draw of the container to be in an out-of-the-way position when it is not needed or being used, and wherein the present invention will facilitate the labeling of a can or container since it will not be necessary to use or have ears that ordinarily hamper the labeling of containers.

Another object is to provide a container handle that may be utilized speedily and with precision by even inexperienced operators.

Further objects and advantages are to provide improved elements and arrangements thereof in a device of the character described that is economical to produce, durable in form, and conducive to the most economical use of materials and uniformity of members formed therefrom.

Still further objects and advantages will become apparent in the subsequent description in the specification.

In the drawings:

FIGURE 3 is a fragmentary elevational view showing a portion of the handle per se.

FIGURE 4 is a sectional view taken on the line 4—4 of FIGURE 3.

FIGURE 5 is a sectional view taken on the line 5—5 of FIGURE 1.

FIGURE 6 is a fragmentary sectional view showing the top member of the can or container before the parts are molded or shaped to their final form.

Figure 1:
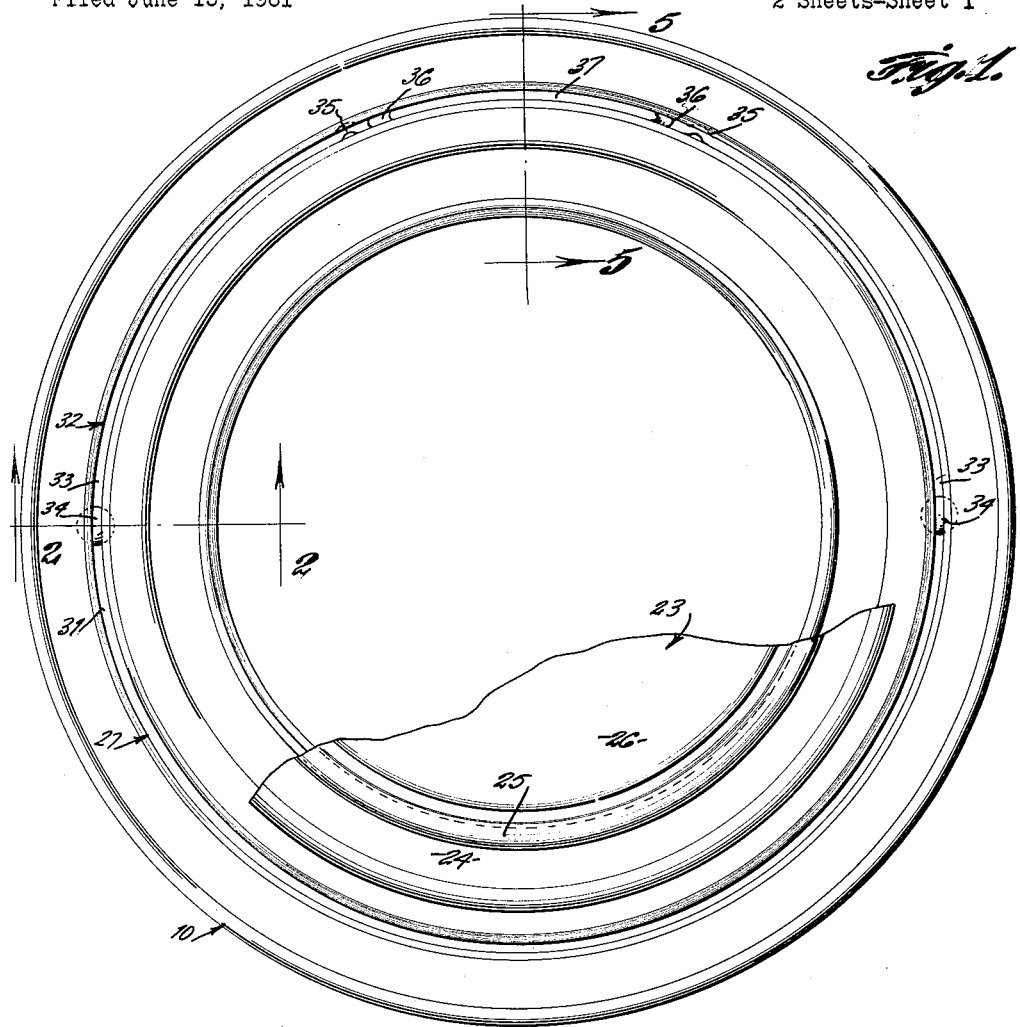
FIGURE 1 is a top plan view illustrating the present invention, and with parts broken away.
Figure 2:
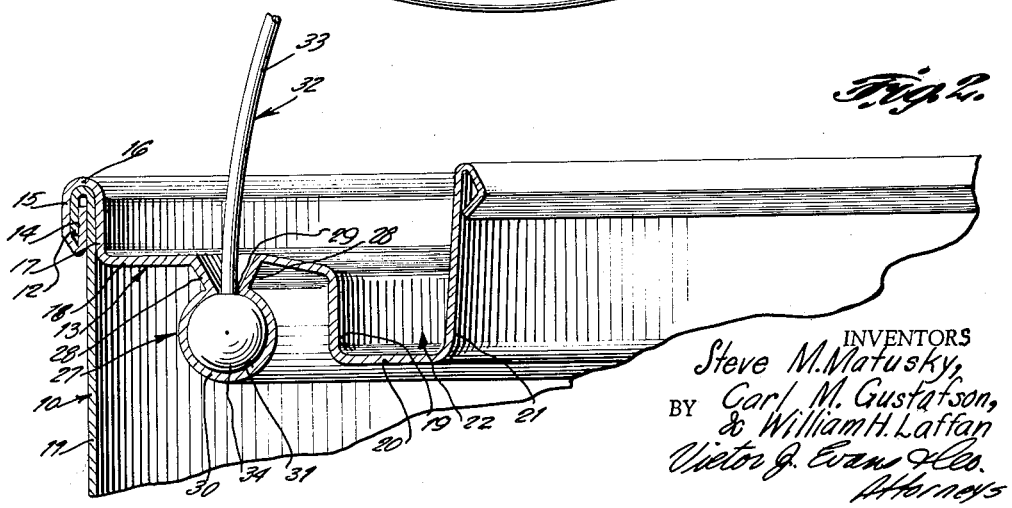
FIGURE 2 is a sectional view taken on the line 2—2 of FIGURE 1.

Referring in detail to the drawings, the numeral 10 indicates a portion of a container or can such as a can for holding paint or the like, and the container 10 includes an annular side wall 11 which has an outwardly arranged downwardly disposed upper edge 12, and the numeral 13 indicates a generally circular top member for the container 10, and the top member 13 includes a first portion 14 which is secured within the edge portion 12 of the side wall 11, FIGURE 2. The top member 13 further includes an upstanding second portion 15 which terminates in a raised arcuate third portion 16, and depending from the portion 16 is a fourth portion 17 which has a generally horizontally disposed fifth portion 18 integral with the lower edge thereof.

As shown in the drawings a sixth portion 19 depends from the inner edge of the fifth portion 18, and the numeral 20 indicates a horizontally disposed seventh portion which is integral with the lower edge of the sixth portion 19, and the numeral 21 indicates an upstanding eighth portion which projects upwardly from the seventh portion 20. The portions 19, 20 and 21 coact to define therebetween an annular recess 22 therebetween.

The numeral 23 indicates a lid for the container, and the lid 23 includes an annular section 24 which is adapted to snugly fit or seat in the recess 22, and the lid 23 further includes a rounded section 25 as well as an intermediate flat section 26.

The numeral 27 indicates an annular support portion which is integral with and depends from the fifth portion 18, and the support portion 27 includes angularly arranged converging wall portions 28 which define a restricted throat 29 therebetween, for a purpose to be later described, and arranged below the throat 29 is an arcuate wall section 30 which is provided with an annular or circular groove 31 therein.

The numeral 32 indicates a handle which includes arcuate end portions 33 which have ball members 34 affixed to the outer ends thereof, and the end portions 33 of the handle 32 extends through the throat 29, and the ball members 34 are maintained within the groove 31 due to the restricted throat 29.

The handle 32 further includes shoulders 35 which are spaced from the ball members 34, and the handle 32 is provided with offset sections 36 which are joined or interconnected by a connecting portion 37.

From the foregoing, it is apparent that there has been provided a handle for a container or can, and in use with the parts arranged as shown in the drawings, it will be seen that referring to FIGURE 6 for example, the numeral 27' indicates the shape of the support portion before it is molded or shaped to its final form, and similarly the numerals 14' and 15' indicate corresponding parts which are in a position before they are bent or moved to their final position such as that shown in FIGURES 2 and 5. By properly shaping the portions such as the portions 27', the throat 29 and wall section 30 will be formed or provided in the finished article.

The top member 13 is secured in place on the side wall 11 as for example by means of the interengagement between the portions 12 and 14 and the top member 13 includes the portion 18 which is provided with the annular recess 22 adjacent thereto, and depending from the portion 18 is the annular support portion 27 which is shaped to include the angularly arranged converging walls 28 as well as the arcuate wall section 30 which defines the continuous groove 31 therein. The ball members 34 which are affixed to the ends of the handle 32 are adapted to be snugly received within the groove 31, and due to the provision of the restricted throat 29, the ball members 34 will not accidentally work loose or pull loose from the groove 31. However, this construction permits the handle 32 to swivel or pivot so that for example the handle can be moved to a lowered or raised position as desired or required. When the handle 32 is in a raised position, all parts of the handle will be below the upper level of the can or container so that there will be no interference with stacking of the cans or containers one upon the other.

The handle 32 includes the arcuate end portions 33 as well as the offset sections 36 which are joined by the connecting portion 37, and the connecting portion 37 provides a convenient hand gripping portion which facilitates the manual handling or movement of the handle. The shoulders 35 function as holding devices or friction detents and are of a size so as to help retain or maintain the handle stationary in its lowered position. However, when sufficient manual pressure is applied to the handle 32 as for example by gripping the portion 37, the frictional holding power or force exerted by the shoulders 35 can be overcome in order to permit raising or pivotal movement of the handle 32 as for example when the handle is being used for carrying the can or container from place to place.

The parts can be made of any suitable material and in different shapes or sizes.

It is to be understood that the lid 23 includes the annular section 24 which is adapted to snugly seat or engage in the annular recess 22, as for example as shown in FIGURE 5, but the section 24 can be readily disengaged from the recess 22 as for example when the lid 23 is to be removed or pryed off of the container.

It is to be noted that according to the present invention a ball and groove arrangement is used for connecting the handle to the container or can, and the present invention eliminates the necessity of using solder which is costly and time consuming. The present invention can be used in connecting various types of containers or cans such as cans used for containing liquids of any desired or required type. The handle of the present invention is capable of being moved through an arc across the top of the container, and when the handle is not being used, it can be conveniently received or seated within the recessed area at the top of the can, as for example as shown in solid lines in FIGURE 5. The ball members 34 function as pivot points for the handle and also serve to maintain the handle connected to the top member 13 so that the handle will not accidentally separate from the container.

In certain instances as an alternative or modification of the present invention, the groove for receiving the ball members can be arranged on the outside of the container as for example in the event a larger opening is needed in the top of the can, and this also facilitates the formation of the top of the draw or groove by using dies.

In addition a can may be made so that the groove is approximately half way around the top thereof instead of extending all the way around the top, and enlarged areas can be provided for facilitating the initial placement of the ball members into the recess or groove so that both ends of the handle can fit in such openings and can turn in the groove. The grooves can be made long or short as desired or required.

It will be seen that with the present invention there is provided an improved means for attaching or mounting a handle on a container, and the present invention does away with the costly and time consuming methods of soldering ears on the container for the handle. Tin plates, or other suitable material can be used in fabricating parts of the present invention, and in addition the parts can be made of other materials such as plastic. The handle is adapted to swivel through an arc of 360°, and when the handle is not being used it will slip into the draw and be out of the way, as for example as shown in FIGURE 5. Since the container does not use ears, such jobs as labeling of containers will be facilitated since there will be no ears to interfere with the labeling operation. The handle can be hid away when not needed as shown in FIGURE 5. Various types of cans or containers can be equipped with the handle construction of the present invention as for example containers for paint, glue, dyes, or the like can be so used. The handle will be hid when not in use and in addition there will be improved stacking and storage of the containers equipped with the handle of the present invention.

FIGURE 5 shows how portions of the handle fit in the draw or support portion 27 when the handle is not being used, and the slight bends or shoulders 35 serve to lock the handle in the draw, and the holding action of the shoulders 35 can be released or overcome when a slight pressure of the fingertips in an upward motion on the portion 37 is applied. The portion 37 provides a convenient finger engaging area for facilitating the lifting up or handling of the handle.

FIGURE 6 shows the position of the parts before final formation thereof and formation can be accomplished in any suitable manner as for example by means of a die or mold, and before forming the portion 27 from the portion 27′, the ball members 34 are inserted therein, so that for example the ball members 34 can move from the solid line position of FIGURE 6 to the broken line position of FIGURE 6, and then the top of the portion 27′ is turned in to form the restricted throat 29, and the handle can then be swiveled 360°. When the handle is moved to the lowered position, it fits snugly in the draw.

The bends or shoulders 35 serves to keep the handle locked in the ring outer draw, and the bends or offset sections 35 serve to insure that the portion 37 will be up out of the draw in order to facilitate manual gripping of the portion 37, and the balls 34 fit in the draw as shown in the drawings.

Minor changes in shape, size and rearrangement of details coming within the field of invention claimed may be resorted to in actual practice, if desired.

What is claimed is:

1. In a device of the character described, a container including an annular side wall having an outwardly arranged downturned edge, a generally circular top member for said container, and said top member including a first portion that is vertically disposed, and said first portion being affixed within the downturned edge of the side wall, an upwardly projecting second portion integral with said first portion and said second portion terminating in an arcuate third portion that has an integral fourth portion depending therefrom, a generally horizontal fifth portion integral with the lower edge of said fourth portion, and said fifth portion being positioned inwardly of said fourth portion, a sixth portion depending from said fifth portion and said sixth portion having a horizontally disposed seventh portion extending inwardly therefrom, and being integral with the lower edge thereof, a vertically disposed eighth portion extending upwardly from said seventh portion; said sixth, seventh and eighth portions providing an annular recess therebetween, a lid including an annular section for snugly fitting in said recess, and said lid further including a rounded section and an intermediate flat section, an annular support portion integral with and depending from said fifth portion, and said support portion including angularly arranged converging wall portions which define a restricted throat therebetween, an arcuate wall section arranged below said throat and said wall section providing a groove therein, a handle including arcuate end portions having ball members on their ends seated in said groove, shoulders on said handle spaced from said ball members, and said handle further including offset sections arranged angularly with respect to said end portions, and a connecting portion joining said offset sections together.

2. A device of the character described comprising a container having a top member provided with a generally horizontal portion which has a support portion depending therefrom, said support portion being of annular formation and said support portion including angularly arranged converging wall portions providing a restricted throat therebetween, an arcuate wall section arranged below said throat and said wall section providing a groove therein, a handle including arcuate end portions having ball members on their ends seated in said groove, shoulders on said handle and said shoulders being spaced from said ball members, said handle further including offset sections which are arranged angularly with respect to said end portions, and a connecting portion extending between said offset sections and formed integral therewith.

References Cited in the file of this patent

UNITED STATES PATENTS

| | | |
|---|---|---|
| 2,652,054 | Bishop | Sept. 15, 1953 |
| 2,935,223 | Crowley | May 3, 1960 |